(12) United States Patent
Nagasaka et al.

(10) Patent No.: US 6,954,583 B2
(45) Date of Patent: Oct. 11, 2005

(54) VIDEO ACCESS METHOD AND VIDEO ACCESS APPARATUS

(75) Inventors: Akio Nagasaka, Kodaira (JP); Takafumi Miyatake, Hachioji (JP)

(73) Assignee: Hitachi Ltd., Tokyo (JP)

(*) Notice: Subject to any disclaimer, the term of this patent is extended or adjusted under 35 U.S.C. 154(b) by 961 days.

(21) Appl. No.: 09/797,723

(22) Filed: Mar. 5, 2001

(65) Prior Publication Data

US 2001/0026678 A1 Oct. 4, 2001

(30) Foreign Application Priority Data

Mar. 17, 2000 (JP) ........................................ 2000-081706

(51) Int. Cl.[7] .............................................. H04N 5/91
(52) U.S. Cl. ............................................ 386/69; 386/68
(58) Field of Search ............................ 386/69, 68, 67, 386/46, 55, 6, 124, 125, 45, 70

(56) References Cited

U.S. PATENT DOCUMENTS 5,126,851 A * 6/1992 Yoshimura et al. ........... 386/60
5,974,218 A * 10/1999 Nagasaka et al. ............ 386/46
2004/0218814 A1 * 11/2004 Miyatake et al. ........... 382/190

FOREIGN PATENT DOCUMENTS

JP          A-7-319901       * 8/1995

* cited by examiner

*Primary Examiner*—Robert Chevalier
(74) *Attorney, Agent, or Firm*—Antonelli, Terry, Stout and Kraus, LLP.

(57) ABSTRACT

Video picture access method and system capable of index manipulation for accessing a video picture without disturbing a user viewing the picture. Visual effect for allowing the user to check instantaneously whether the index manipulation conforms to user's intention. List display unit displays in superposition on a video picture a list containing reduced-size representative images for scenes included in the picture. Exhibition unit makes into appearance a display field of the list while extending stepwise the list over a time. User interface enables selection of a representative image of a scene to be next displayed from the list. Video reproducing unit provides such visual effect that reproduction of a video picture for the selected scene is started from the position of the selected image and a size thereof and makes transition gradually to a full screen picture.

7 Claims, 7 Drawing Sheets

VIDEO ACCESS METHOD AND VIDEO ACCESS APPARATUS

BACKGROUND OF THE INVENTION

The present invention generally relates to an apparatus for reproducing or playing back pictures such as motion or moving pictures, those of television programs and the like. More specifically, the present invention is concerned with a method of making access to pictures by using a storage medium susceptible to random access such as a hard disk or the like and a system for carrying out the video picture access method. Parenthetically, the picture stored in a storage medium such as a hard disk, a digital video disk, a compact disk or an optical disk in general or the like for the playback will hereinafter be referred to as the video picture only for the convenience of description.

With the advent of hard disks of large capacity capable of storing a large volume of video picture over several ten hours and commercially available at a relatively low price, a video picture recording/reproducing apparatus equipped with the hard disk as the storage medium has been developed for practical use. Besides, a video picture recording/reproducing apparatus in which an optical storage medium such as DVD (Digital Versatile Disk) is also finding practical applications increasingly. An advantage common to these video picture recording/reproducing apparatuses is found in that because of implementation of the storage medium in the form of a disk, access to a given record can be accomplished at a very high speed. Even when a plurality of programs are recorded on a disk-like recording medium, searching of a given program can be realized almost instantaneously, differing from the recording on a video tape, in which case the indexing operation is possible only after the fast feeding or rewinding of the tape. Further, some of picture recording/reproducing software designed to run on a personal computer or the like is so designed or programmed as to create an index composed of leading images of plural scenes included in a video picture by arraying them in the form of a list or array containing representative images of reduced size so that a viewer or user can select the scene which he or she wants to view and reproduce instantaneously a corresponding video picture starting from the selected scene. Such combination of availability of the index information and the high accessibility to the disk-like recording medium as mentioned above provides excellent convenience to the user.

SUMMARY OF THE INVENTION

However, the conventional techniques suffer several shortcomings. By way of example, when a video picture is selected to be played back by making use of or referencing the index, it is required to change over a screen image (i.e., image on a display screen) solely of a video picture with that solely of the index or alternatively allocate partially a field or area of the display screen to the playback of the video picture with another field or area being assigned to the display of the images serving as the index information. In more concrete, let's suppose that a viewer is enjoying a video picture being reproduced or played back in a full screen size as in the case of watching a program on a television receiver and that he or she wants to view another part of the video picture by making use of the index information. In that case, the full-screen image changes abruptly from the video picture to the display of the index images, which will give an impression of discontinuity to the viewer, impairing his or her feeling of enjoying the video picture with absorbed interest. Additionally, because the video picture being played back and the index images are displayed as the completely independent screen images or separately in discrete screen fields, respectively, the user will encounter difficulty in understanding clearly the correlation between the video picture and the index images. In some cases, the user may feel uncertainty as to whether the scene selected from the list of index images is being properly played back. In this conjunction, it should also be taken into consideration that the user's action of selection is likely to be accompanied with chattering of a designating device, unconscious doings or the like, as a result of which the scene differing from the intended one may unwantedly be selected.

Additionally, when the storage medium such as the hard disk which permits the access thereto at a very high speed is made use of, changeover of the screen image from the video picture being viewed to a new one selected for the playback will take place instantaneously, making it difficult to clearly discern the changeover from the transition of one scene to another which ordinarily occurs in one and the same video picture. In the conventional tape-type VCR (Video Cassette Recorder) in which the changeover among the scenes is effectuated after rewinding or fast feeding of the tape, noise generated upon operation of magnetic heads as well as noise generated upon winding of the tape can be made use of as a sign or clue suggesting the scene change. By contrast, in the applications where the hard disk, optical disk or the like is employed as the recording medium, such mechanical noise is inaudible, which renders it more difficult for the user to recognize discretely the picture changeover such as mentioned above.

In the light of the state of the art described above, it is an object of the present invention to provide a video picture access method and a system therefor which are capable of carrying out the scene selecting or indexing operation in the course of reproduction or playback of a video picture without impairing or disturbing user's comfortableness of viewing continuously the video picture without being disturbed by interruption or interception.

Another object of the present invention is to provide visual effect presentation facility which allows the user or viewer to recognize instantaneously whether the indexing operation has been performed in conformance with his or her intention.

In view of the above and other objects which will become apparent as the description proceeds, there is provided according to a general aspect of the present invention a video picture access system which includes a representative image list display function for displaying in superposition on a video picture being displayed on a display screen a representative image list containing at least one representative image of a reduced size corresponding to a scene included in the video picture, an exhibition function for making into appearance the representative image list while extending stepwise a display field of the representative image list over a predetermined time duration, a user interface function for enabling selection of a representative reduced-size image of a scene intended by a user to be next displayed from the representative image list, and a video picture reproducing function capable of exhibiting such visual effect that reproduction of a video picture corresponding to the selected scene is started at a display position of the selected representative reduced-size image with a size thereof, whereon the reproduction makes transition temporally gradually to a full screen reproduction in which said video picture is displayed substantially over a whole surface of the display screen.

These and other objects, features and advantages of the present invention will become more apparent in view of the following detailed description of the embodiments of the invention in conjunction with the accompanying drawings.

BRIEF DESCRIPTION OF THE DRAWINGS

In the course of the description which follows, reference is made to the drawings, in which.

DETAILED DESCRIPTION OF THE EMBODIMENTS

Figure 1:
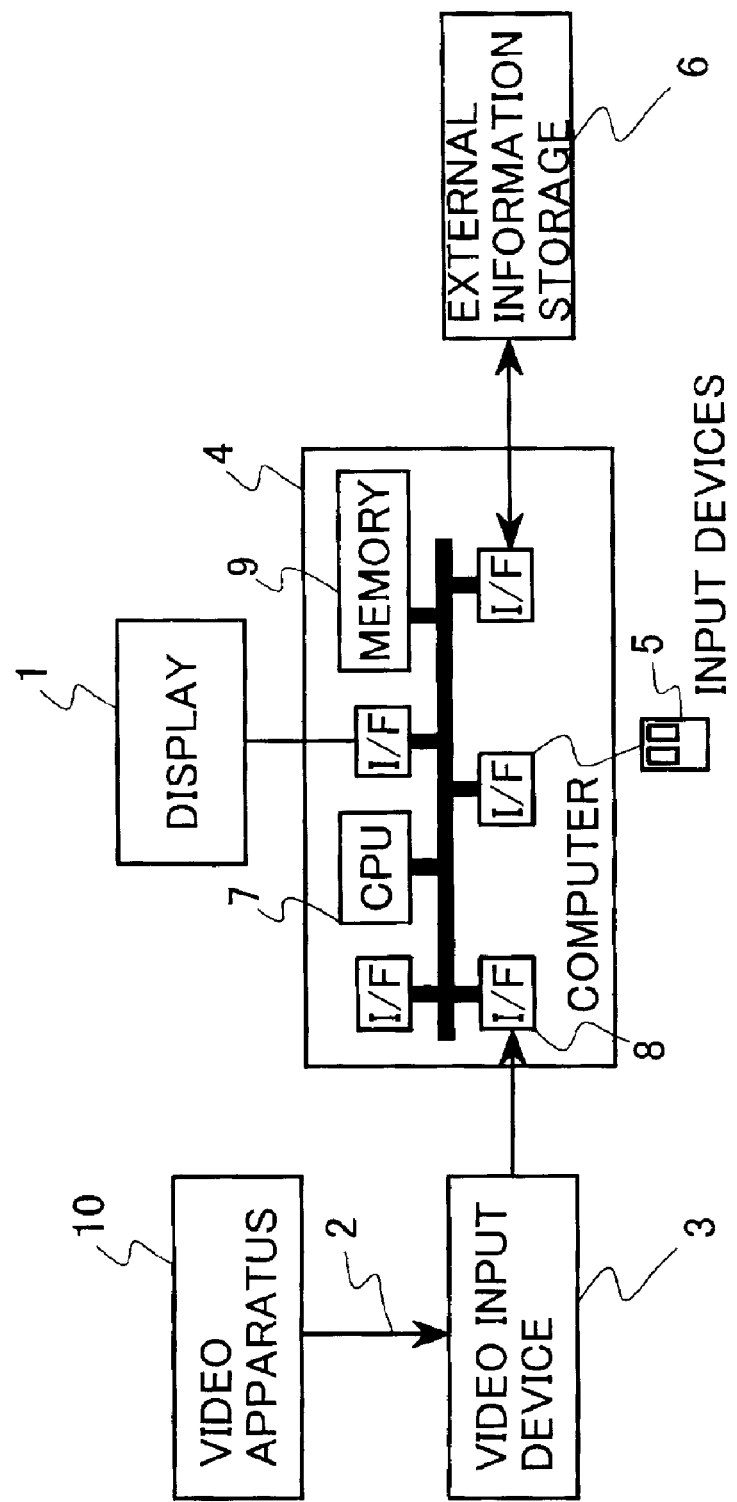
FIG. 1 is a block diagram showing generally and schematically an exemplary configuration of a system for realizing the present invention.

The present invention will be described in detail in conjunction with what is presently considered as preferred or typical embodiments thereof by reference to the drawings. In the following description, like reference characters designate like or corresponding parts throughout the several views.

FIG. 1 is a block diagram showing generally and schematically an exemplary configuration of a system for realizing the concept contemplated with the present invention. In the figure, reference numeral 1 denotes a display device which may be constituted by a CRT (Cathode-Ray Tube), an LCD (Liquid Crystal Display) device or the like and which is designed for displaying video pictures outputted from a computer 4. Instructions or commands for the computer 4 can be inputted by using an input device 5 such as a keyboard, a pointing device typified by a mouse, a touch panel or the like. A video apparatus 10 is comprised of a tuner device designed for receiving broadcasting programs such as of ground wave broadcasting, satellite broadcasting, cable television facility and/or the like. Alternatively, the video apparatus 10 may be constituted by an apparatus designed for reproducing video pictures recorded on an optical disk, a video tape or the like recording media. Video signals 2 outputted from the video apparatus are sequentially converted into digital image data and digital audio data by means of a video input device 3 to be subsequently supplied to a computer. In the computer, the digital image data is transferred to a memory 9 by way of an interface 8 to undergo processings by a CPU (Central Processing Unit) 7 in accordance with a program(s) stored in the memory 9. Various information and data can be stored in an external information storage 6 as the processing requires. Furthermore, there are stored in the memory 9 a variety of data generated through the processings described below, which data can be referenced as the need arises.

Figure 2:
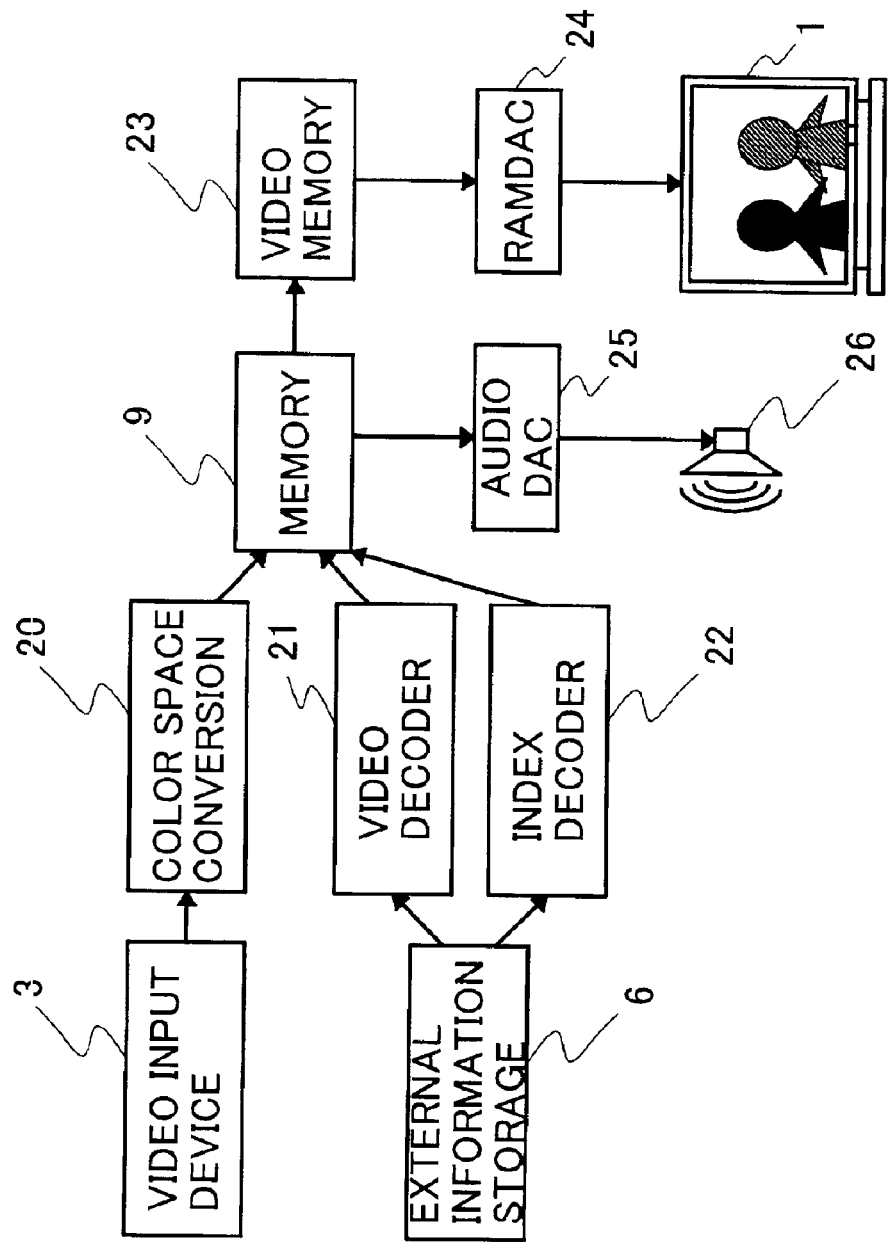
FIG. 2 is a functional block diagram for illustrating exemplarily flows of video data in the system shown in FIG. 1.

FIG. 2 is a schematic functional block diagram for illustrating in detail flows of the video data in the system of the structure described above. The image data and the audio data digitalized by the video input device 3 as mentioned previously are stored in the memory 9 which can be managed by the CPU 7. The image data undergoes conversion through a color space converter 20 into a color space format capable of easy handling by the program running on the CPU or alternatively into a color space format which facilitates display, as the case may be. By contrast, in the case where the video signal is straightforwardly available as the digital data as in the case of digital broadcasting or the like, the video input device 3 is designed to play a role for converting the digital data into an image data format which can easily be handled by the program running on the CPU or which is easy to handle for the display. On the other hand, digital video data stored in the external information storage 6 such as a hard disk in the format based on MPEG (Motion Picture Experts Group) or the like is converted into an image data format easily susceptible to the handling by the program on the CPU or for the display and then transferred to the memory 9. In this conjunction, it should however be mentioned that in the case where the digital video data is already stored in a data format easy to handle such as non-compressed data, the video decoder 21 can be spared.

An index decoder 22 is provided for converting the data stored in the external information storage 6 into a data format for the image destined for index generation. When both the video data and the index image data are stored in the external information storage 6 in a same data format or when a part of the video data is made use of as the index image data, the functions of the two decoders 21, 22 mentioned above can be implemented by a single decoder. The video decoder 21 and the index decoder 22 may be realized either by hardware or softwarewise by a descriptive program. The image data stored in the memory 9 is synthesized combinatorially into a single screen image on a video memory 23 by means of the CPU 7. To this end, a RAMDAC (Random Access Memory Digital-to-Analog Converter) 24 reads out sequentially and orderly the contents of the video memory 23 periodically at a predetermined interval to thereby generate a signal which can be displayed on the display device 1. On the other hand, the audio data is supplied to a speaker 26 by way of an audio D/A (Digital-to-Analog) converter 25.

Now, description will be made in detail of the flow of processings (software) executed by the hardware described above and by the CPU 7 among others for solving the subject matter contemplated with the present invention.

In the first place, description will be directed to a method or procedure which makes it possible to display picture-relevant information (i.e., information relevant to a video picture being displayed) such as index image data or the like without calling away or disturbing the attention of a viewer who is absorbed in watching or viewing the picture. As the major factors which disturb or impair the viewer's comfortableness of viewing the video picture with absorbed interest and which are ascribable to the display of the index images, there may be mentioned such situations that index image(s) is constantly displayed on a same display screen together with an intrinsic video picture by occupying partially a field or area of the display screen with a result that the video picture is displayed forcibly in a reduced size, a video picture having been viewed heretofore is abruptly changed over to the display of an index image or that image(s) irrelevant to the video picture being viewed such as background image of the operating system, windows of other application programs or the like makes appearance. For excluding such disturbing factors as mentioned above, it is required to allow the intrinsic video picture to be displayed on a full screen as in the case of the conventional television display, whereas when display of the index images is demanded, the index images are caused to make appearance stepwise in succession without intercepting discontinuously the video picture having been viewed heretofore while eliminating any room for the irrelevant image(s) to be displayed.

Figure 3A:
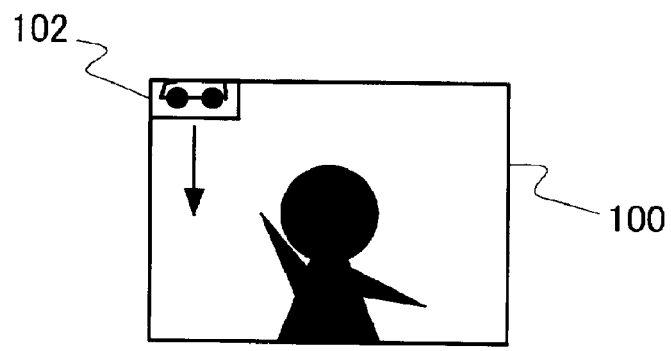
FIGS. 3A, 3B and 3C are views for illustrating pictorially an index displaying method according to which index images are caused to make appearance stepwise.
Figure 3B:
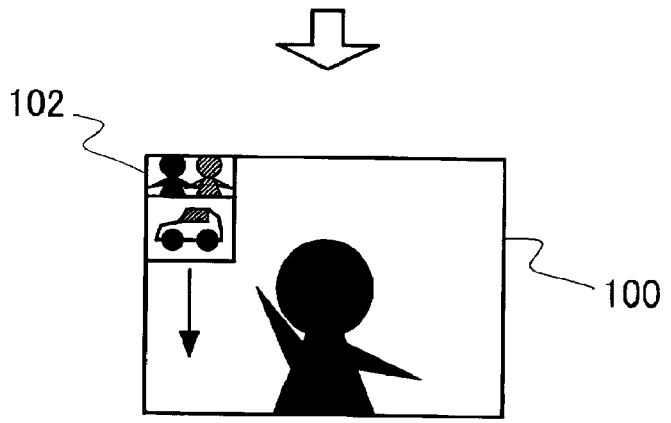
Figure 3C:
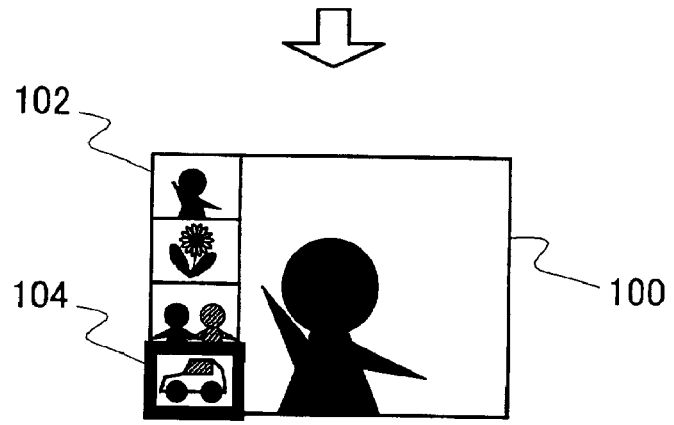
Figure 4:
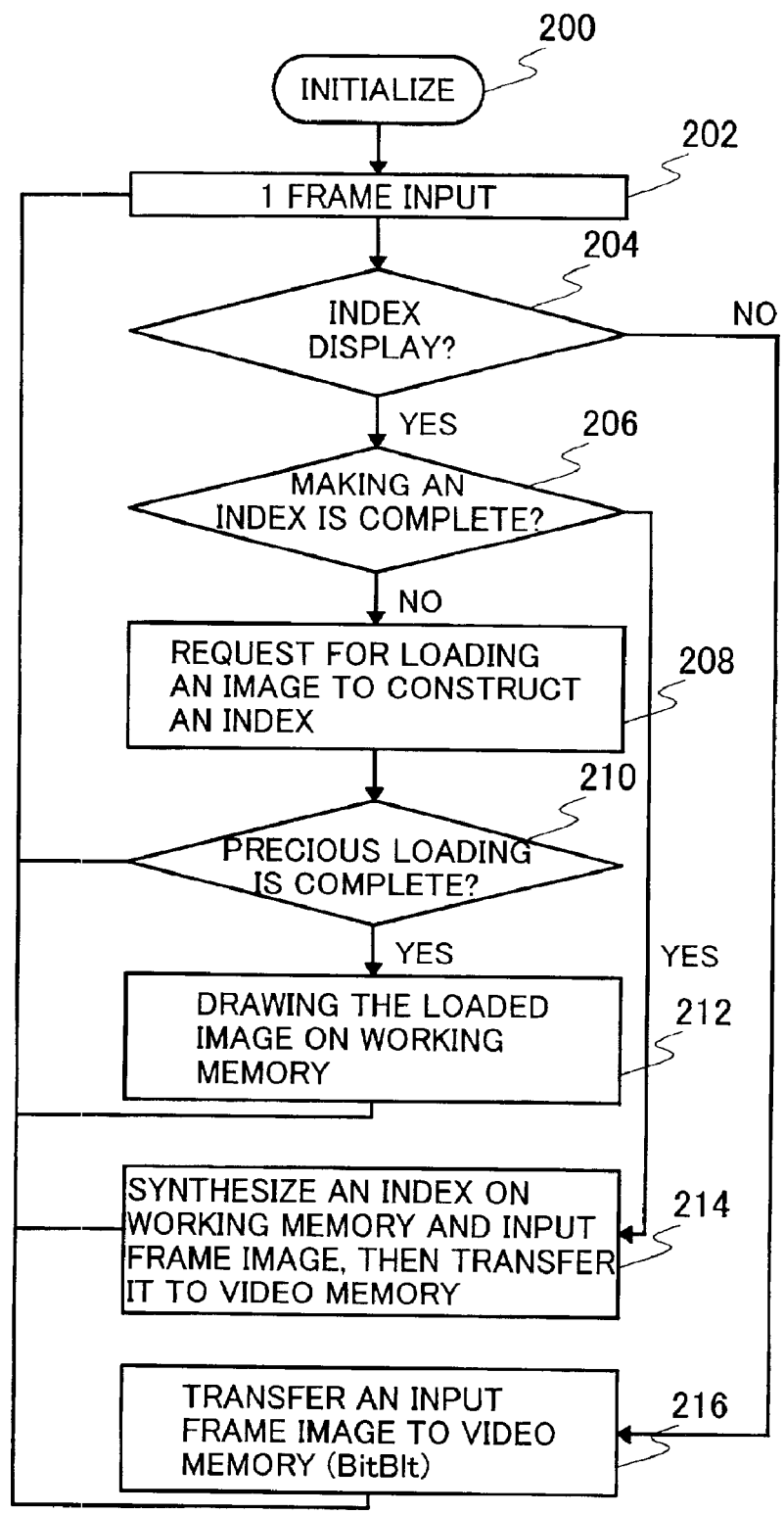
FIG. 4 is a flow chart for illustrating, by way of example, a processing procedure for displaying index image(s) without interrupting display of a video picture.

FIGS. 3A, 3B and 3C are views showing schematically a sequence of index images for illustrating an index displaying method proposed by the present invention for achieving the object thereof mentioned hereinbefore. Referring to the figures, a video picture is displayed on a display screen 100 of the display device 1 through the medium of the video input device 3 mentioned previously on the presumption that the picture on the display screen 100 as a whole changes sequentially as a function of time lapse in the order of FIGS. 3A, 3B and 3C. As can be seen in these figures, the display area for the index data (i.e., index images) 102 is extended or stretched stepwise in the direction from the top toward the bottom until the display area has ultimately occupied one fourth of the whole screen area at a left-hand side thereof, as illustrated in FIG. 3C. In the index image display in the final stage (FIG. 3C), a representative image of a scene which can be selected is ornamented with a frame 104 for emphasis. In the index image displaying state illustrated in FIG. 3C, the frame 104 can be shifted to another representative image for another scene in response to a corresponding user's (viewer's) command inputted through the keyboard or the like for displaying the selected index image with the frame for emphasis. Incidentally, when there exist too many representative images to be displayed on the screen area, these representative images may be displayed in succession to one another by making use of a scroll display function or the like. In order to realize smoothly the display procedure described above, reading or fetching of the index image data and the display thereof as well as combination or synthesization of the index image data with the video picture data supplied from the video input device 3 has to be carried out smoothly without stagnation. More specifically, when the processing is concentrated onto reading or fetching of the index image data, there may arise, for example, such situation that the display of the video picture is stopped or interrupted during the processing period, disturbing comfortableness of the user who is viewing the video picture with absorbed interest. As mentioned hereinbefore, the primary object of the present invention is to ensure comfortableness for the user viewing a video picture regardless of displaying the index images representing the scenes included in the video picture. In view of this, the present invention teaches that the index data read processing be stepwise or gradually executed a few at a time to thereby prevent such display stagnation or interruption as mentioned above. The concept underlying the invention will be elucidated below by reference to a flow chart shown in FIG. 4.

For displaying the video picture, the CPU 7 executes at first various initialization processings as required in a step 200, whereon one image frame of a video picture is fetched from the video input device 3 in a step 202. At that time point, it is checked in a step 204 whether or not the display of the index image is commanded. Unless the index display is commanded, the frame image as inputted or fetched is simply transferred to the video memory 23 in a step 216, whereon the processing step 202 is resumed. The video image data transferred to the video memory is read out through the RAMDAC 24 to be displayed on the display screen. On the other hand, when the index display command has been issued, it is then checked in a step 206 whether or not all the index images to be displayed as a single or unit screen image have been fetched, i.e., whether or not all the relevant index data exist availably. When all the index data are available (i.e., when the decision step 206 results in affirmation "Yes"), then the index data are synthesized or combined with the frame image data fetched in the step 202 to be subsequently transferred to the video memory 23 (step 214). In that case, when all the index data are wholly available, only a part of the index data is initially synthesized with the video frame data, and then the index data to be synthesized is gradually increased so that the whole index is ultimately embedded in the video frame image to be finally transferred to the video memory 23. Through the procedure described above, the stepwise or progressive index display such as illustrated in FIGS. 3A, 3B and 3C is realized. On the other hand, when the index data is incomplete or insufficient, a request for reading supplementary representative image data constituting the index is issued. The processing for this read request is not executed as the task included in the main loop now under discussion but executed as another task. The task of the read request processing is imparted with priority lower by one rank than the main loop illustrated in FIG. 4 and thus executed on a part-by-part basis by taking advantage of spare time occurring in execution of the main loop. Through the read request processing, the index data requested is read out from the external information storage 6 to undergo the decode processing as the occasion demands. In this manner, the index data for the representative images for the scenes included in the video picture being displayed can be acquired.

On the other hand, in a processing step 210 which succeeds to the processing step 208, it is checked whether the processing for the request for reading the index image data executed last time has been completed or not. Unless the read request was issued in the past or when the processing for the read request has not been completed yet, the processing step 202 is intactly resumed. By contrast, when the processing mentioned above has been completed, the representative image data as read is written in an index-dedicated working memory. The index information is ordinarily composed of plural representative images. Accordingly, unless all of the plural index images have been formed on the working memory with all the representative image data having been written, decision to the effect that the index information has been completed can not be obtained in the processing step 206.

Figure 5:
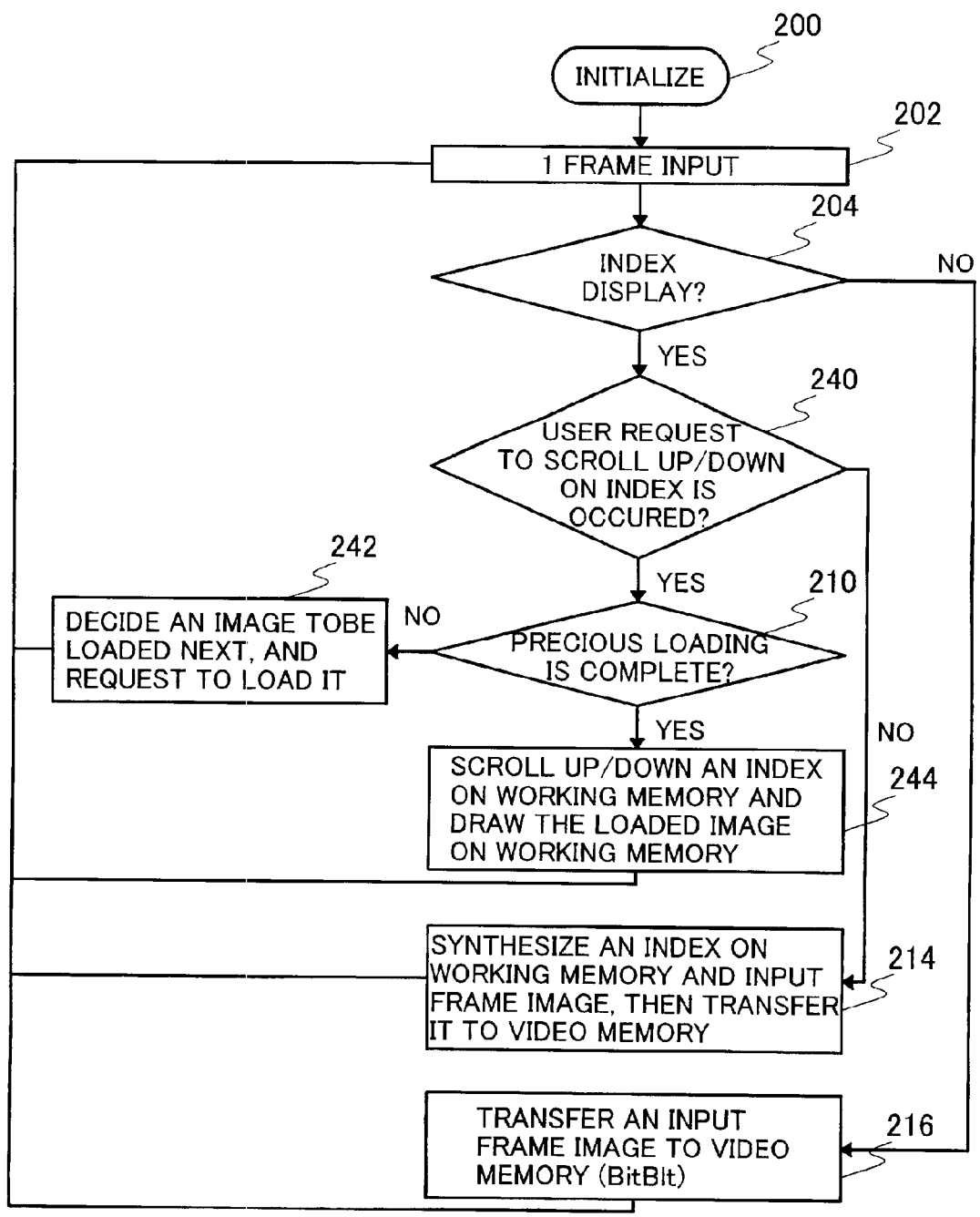
FIG. 5 is a flow chart for illustrating, by way of example, a processing procedure for displaying the index images through scrolling without involving stagnation or interruption in the playback of a video picture.

The procedure described above may also be adopted for displaying the index through scrolling. In that case, the scroll display can be realized without being accompanied with stagnation in the playback of the video picture. This will be described by reference to a flow chart shown in FIG. 5. Referring to this flow chart which is essentially similar to the one shown in FIG. 4, a scrolling request is issued by the operator or user in a step 240, which is then followed by a step 242 where the representative image to be newly displayed through scrolling is determined, whereupon a request for reading data of the index image as determined is issued. The processing for this read request is executed as a task assigned with priority lower by one rank, as described hereinbefore. Thus, this read request processing can be executed in such a manner that no interruption occurs in the reproduction of the video picture. Upon completion of this read processing (step 210), the index stored and developed on the working memory is scrolled for allowing the read or fetched index image data to be newly written in the working memory, for thereby constituting a new index. Ordinarily, as the representative image to be newly displayed through scrolling, the representative image of the immediately succeeding or preceding scene is selected. In this connection, it should however be noted that the representative image of the scene which precedes or succeeds by several scenes may be selected as the representative image to be newly displayed in the index field in response to a corresponding command inputted by the user. By way of example, when the scrolling command is inputted by pressing a key(s), the representative image of the scene remote by a distance which corresponds to a time period during which the key is continuously held in the pressed or pushed state. In this way, pushing of the key for a short duration allows a fine scrolling control to be realized, while as the key pushing duration increases, the scrolling speed is correspondingly accelerated, which makes it possible for the user to grasp speedily all the representative images even when a large number of representative images are presented available. Further, when a jog-and-shuttle manipulator which is employed in many video editors or the like is used as the input device, it is possible to display the representative image of the scene remote by a spatial or temporal distance which corresponds to a rotation speed of a jog dial or an angle of rotation of a shuttle ring of the jog-and-shuttle manipulator.

The scroll displaying method described above can be applied for searching the scenes bearing similarity to each other in the video picture. By way of example, the television program includes similar scenes in a repetitive fashion in many cases. Suppose, for example, a news program. In this sort of program, there usually exists such a stereotyped portion that a newscaster makes appearance to read aloud headlines of news upon every changing of news items. Accordingly, if the search for similar scenes can be carried out upon finding a representative image of the newscaster reading the headlines in the index field by making use of that representative image as the key image, then only the headlines can be surveyed swiftly. For realizing this procedure, a given representative image is selected from the index for executing the search for the similar scenes in response to a corresponding command inputted through the keyboard or manipulation of the pointing device. Subsequently, request for reading or fetching the representative image for the scene as found is issued as in the case of the scroll display, whereupon the representative image as found is additionally written in the index for display. Of course, instead of effecting the scroll display, the index may wholly be so updated that a list of the representative images for the scenes preceding and succeeding to the found one can be made available. For the similar scene search, various conventional search methods may selectively be employed. By way of example, such method may be adopted that histograms are determined for all the representative images one after another to thereby determine square sums between these histograms and that of the representative image selected as the key image. Then, the representative image for which the square sum is smaller than a predetermined threshold value is outputted as the result of the similar scene search. When a plurality of similar scenes for which the square sum is smaller than the threshold value are found as the result of the similar scene search, then the scene which is located temporally closest to the scene selected as the key image in the index may be displayed as the ultimate similar scene. In this conjunction, such arrangement may also be adopted which allows the user to select a temporally forward search or a temporally backward search. In that case, the index display can be updated when the scene located temporally closest to the scene selected as the key image is found in the search direction designated by the user. In this conjunction, when it is expected that a lot of time is involved in executing the similar scene search processing, the task therefor may be imparted with priority of lower level so that the video reproduction is protected from being interruption due to the similar scene search processing.

Figure 6A:
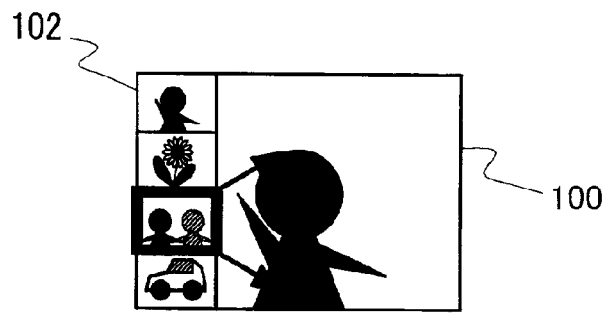
FIGS. 6A 6B and 6C are views for illustrating pictorially a method of starting playback of a video picture with a scene represented by a selected index image being gradually extended.
Figure 6B:
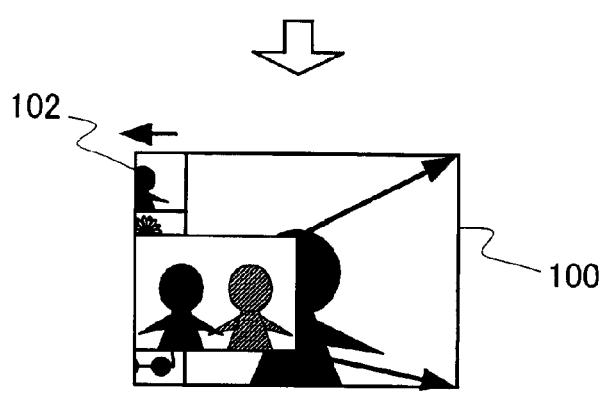
Figure 6C:
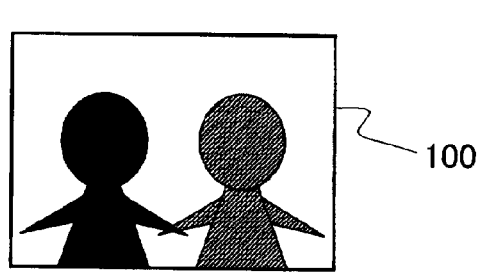

By making use of the index information displayed in the manners described above, the user can select a given one of the representative images being displayed as the index information by inputting a corresponding command through the keyboard or manipulation of the pointing device or scrolling the index to thereby start the playback or reproduction of the video picture from the scene which corresponds to the selected representative image. In this conjunction, FIGS. 6A 6B and 6C illustrate, by way of example, a method of starting the playback of a video picture. Referring to the figures, a video picture inputted through the video input device 3 mentioned previously is being displayed on the display screen 100 of the display device 1. The video picture changes stepwise in the sequential manner illustrated in FIGS. 6A, 6B and 6C in this order as the time lapses. More specifically, these figures show that the area of a representative image selected by the user through the key input operation or manipulation of the pointing device and displayed with frame for emphasis as described hereinbefore is gradually extended stepwise, starting-from the index position, in response to the playback start command inputted by the user until the selected representative image has ultimately occupied the whole area of the display screen. In that case, the index representative images not selected are caused to scroll or move leftward and disappear from sight of the user, as can be seen in the figures. The display method described above can be realized by changing gradually the ratio of synthesization of the three images, i.e., the video picture inputted through the video input device 3, the picture for reproduction or playback stored in the external information storage 6 and the index image. By adopting the scheme of displaying the index in superposition on the video picture serving as the base, reproduction of the video picture can be started while allowing the user to recognize explicitly which of the scenes in the index has been selected.

Figure 7:
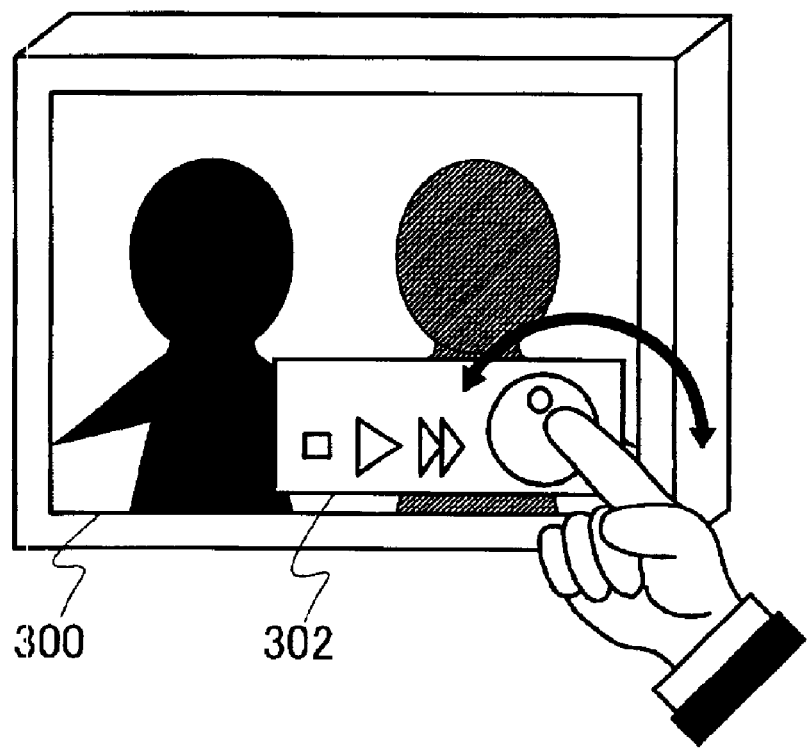
FIG. 7 is a view for illustrating, by way of example, a method of emulating a jog-and-shuttle function with a touch panel.

Although the foregoing description has been made, only by way of example, on the presumption that the video picture supplied through the video input device 3 and the index image(s) are synthesized for the concurrent display, it goes without saying that the teachings of the present invention can equally be applied to the synthesization of the video picture stored in the external information storage 6 with the index image(s). In particular, when the video picture is supplied through the medium of the video input device, the video picture display and the index picture display may be generated individually and separately on respective drawing planes or layers and superposed by resorting to hardware facilities. Furthermore, the video picture supplied through the video input device may be transferred via DMA (Direct Memory Access) or the like independently from the CPU. In that case, interruption of the video picture can effectively be suppressed without need for positive control of the CPU. However, in the case where the video picture is read out from the external information storage for display, the CPU plays a major role. Thus, the control by the CPU in the manner described above bears great importance. Additionally, in the foregoing description of the illustrated embodiments of the present invention, it has been assumed that the user's commands are inputted with the aid of a keyboard and/or a pointing device such as a mouse used widely in personal computers. However, a remote controller employed conventionally in AV (Audio and Visual) equipment and a touch panel may be used substantially to the same effect. Among others, the touch panel which the user can directly touch provides an interface which is easy to understand intuitively even by the beginners. Accordingly, the touch panel can serve as the especially effective interface for an intelligent multi-function video system which incorporates a lot of functions when compared with the conventional single function video system and which is apt to be complicative in manipulation. By way of example, when the touch panel is employed, a concerned representative image of the index being displayed can be selected very simply and easily merely by touching directly that representative image for thereby commanding the start of reproduction of the video picture relevant thereto. Additionally, various input devices employed heretofore in the conventional video equipment can be emulated. By way of example, the jog-and-shuttle function is a handy function for reproduction of a video picture with special effect. To this end, a jog-and-shuttle may be displayed as a graphic on a screen 300 as illustrated in FIG. 7 by way of example. In that case, by tracing the jog-and-shuttle graphic 302 on the screen 300 with a finger of the user as if it were a real jog-and-shuttle manipulator, the very functions thereof can be reenacted. Referring to FIG. 7, the jog-and-shuttle graphic is basically composed of a large circle and a pair of small circles positioned along the circumference of the former. The small circle represents a symbol of representative image list and functionally corresponds to a revolving handle of a real jog-and-shuttle manipulator. By moving the graphic jog-and-shuttle by tracing it with a finger of the user, the big circle rotates in the direction in which it is jogged by the finger while indicating magnitude of the rotation. By emulating various devices in this way, numerous different input functions can be realized only with the touch panel. In other words, only with the touch panel, substantially all the functions as demanded can be implemented.

According to the teachings of the present invention, the video picture can continuously be displayed together with the index images making appearance on a same display screen without impairing the viewer's attention concentrated onto the video picture. Furthermore, since reproduction of the video picture can be started, being extended gradually from the position of the selected index image, the start of reproduction of the selected video picture as well as correctness of the selection can be confirmed straightforwardly.

While the present invention has been described above in conjunction with the embodiments, one having the ordinary knowledges in the art would be enabled by this disclosure to make various modifications to this embodiment and still be within the scope and spirit of the present invention as defined in the appended claims.

What is claimed is:

1. A video picture access system, comprising:
   representative image list display means for displaying in superposition on a video picture being displayed on a display screen a representative image list containing at least one representative image of a reduced size corresponding to a scene included in said video picture;
   exhibition means for making into appearance said representative image list while extending stepwise a display field of said representative image list over a predetermined time duration;
   user interface means for enabling selection of a representative reduced-size image of a scene by a user to be next displayed from said representative image list; and
   video picture reproducing means capable of exhibiting such visual effect that reproduction of a video picture of the scene corresponding to the selected representative reduced-size image is started at a display position of said selected representative reduced-size image with a size thereof, whereon said reproduction makes transition temporally gradually to a full screen reproduction in which said video picture is displayed substantially over a whole surface of said display screen.

2. A video picture access system, comprising:
   means for displaying a disk-like image; and
   input means implemented in the form of a touch panel,
   wherein a jog-and-shuttle function is realized by touching said disk-like image and moving rotationally said disk-like image by tracing it with a finger.

3. A video picture access method, comprising the steps of;
   displaying in superposition on a video picture being displayed on a display screen a representative image list containing at least one representative image of a reduced size which corresponds to a scene included in said video picture;
   making into appearance said representative image list while extending stepwise a display field of said representative image list over a predetermined time duration;
   starting reproduction of a video picture of a scene corresponding to a representative reduced-size image selected by an operator to be next displayed from said representative image list at a display position of said selected representative reduced-size image with a size thereof; and
   causing said reproduction to transit temporally gradually to a full screen reproduction in which said video picture is displayed substantially over a whole surface of said display screen.

4. A computer implemented program for performing a video picture access method, comprising the steps of;
   displaying in superposition on a video picture being displayed on a display screen a representative image list containing at least one representative image of a reduced size which corresponds to a scene included in said video picture;
   making into appearance said representative image list while extending stepwise a display field of said representative image list over a predetermined time duration;
   starting reproduction of a video picture of a scene corresponding to a representative reduced-size image selected by an operator to be next displayed from said representative image list at a display position of said selected representative reduced-size image with a size thereof; and
   causing said reproduction to transit temporally gradually to a full screen reproduction in which said video picture is displayed substantially over a whole surface of said display screen.

5. A video picture access system according to claim 1, further comprising:
   means for displaying a disk-like image; and
   input means implemented in the form of a touch panel,
   wherein a jog-and-shuttle function is realized by touching said disk-like image and moving rotationally said disk-like image by tracing it with a finger.

6. A video picture access method according to claim 3, further comprising the steps of:
   displaying a disk-like image; and
   utilizing a touch panel as an input means;
   wherein a jog-and-shuttle function is realized by touching the disk-like image and moving rotationally the disk-like image by tracing it with a finger.

7. A computer implemented program according to claim 4, further comprising the steps of:
   displaying a disk-like image; and
   utilizing a touch panel as an input means;
   wherein a jog-and-shuttle function is realized by touching the disk-like image and moving rotationally the disk-like image by tracing it with a finger.

* * * * *